United States Patent
Zhou et al.

(10) Patent No.: US 8,775,401 B2
(45) Date of Patent: *Jul. 8, 2014

(54) SHAPE BASED PICTURE SEARCH

(71) Applicant: Alibaba Group Holding Limited, George Town (KY)

(72) Inventors: Chunyi Zhou, Hangzhou (CN); Weiwei Wang, Hangzhou (CN); Xinfeng Zhou, Hangzhou (CN); Yu Dong, Hangzhou (CN); Xiaoying Weng, Hangzhou (CN); Jialong Huang, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 13/757,479

(22) Filed: Feb. 1, 2013

(65) Prior Publication Data

US 2014/0046944 A1 Feb. 13, 2014

Related U.S. Application Data

(63) Continuation of application No. 12/661,773, filed on Mar. 22, 2010, now Pat. No. 8,392,484.

(30) Foreign Application Priority Data

Mar. 26, 2009 (CN) .......................... 2009 1 0129551

(51) Int. Cl.
*G06F 17/30* (2006.01)
(52) U.S. Cl.
USPC .................... 707/707; 707/758; 707/E17.089
(58) Field of Classification Search
USPC ................... 707/758, 915, 999.003, 999.006, 707/999.107, E17.089
See application file for complete search history.

(56) References Cited

U.S. PATENT DOCUMENTS

| | | | | |
|---|---|---|---|---|
| 5,751,286 A | * | 5/1998 | Barber et al. | 715/835 |
| 6,415,282 B1 | * | 7/2002 | Mukherjea et al. | 707/737 |
| 6,463,426 B1 | * | 10/2002 | Lipson et al. | 1/1 |
| 7,039,229 B2 | * | 5/2006 | Lin et al. | 382/165 |
| 7,054,481 B2 | * | 5/2006 | Lloyd-Jones | 382/162 |
| 2006/0206482 A1 | * | 9/2006 | Soussaline et al. | 707/6 |
| 2007/0133947 A1 | * | 6/2007 | Armitage et al. | 386/95 |
| 2007/0274609 A1 | * | 11/2007 | Hirai et al. | 382/305 |
| 2008/0082426 A1 | * | 4/2008 | Gokturk et al. | 705/27 |
| 2010/0232719 A1 | * | 9/2010 | Vincent et al. | 382/225 |
| 2010/0293164 A1 | * | 11/2010 | Weese et al. | 707/737 |

* cited by examiner

*Primary Examiner* — Leslie Wong
(74) *Attorney, Agent, or Firm* — Van Pelt, Yi & James LLP

(57) ABSTRACT

The present application relates to a method for implementing picture search and a website server thereof. A method for implementing picture search includes: classifying, according to keywords in advance in a picture database, corresponding pictures by shape of objects in the pictures, and determining a sample picture for each shape type; wherein, after a server receives a picture search request sent from a client, the method includes: searching, by the server, in the picture database for the sample picture of several shape types classified in advance corresponding to the keywords in said search request, and returning, to the client, the searched sample picture of the several shape types; receiving, by the server, the sample picture of a certain shape type determined by the client, and searching, in the picture database for the pictures which correspond to said keywords and satisfy a predetermined request with the characteristic value of said determined sample pictures; returning, by the server, said found pictures to the client. The present application enables the user to search pictures of similar shapes according to the shape types, thereby satisfying the user's search demands.

20 Claims, 7 Drawing Sheets

SHAPE BASED PICTURE SEARCH

CROSS REFERENCE TO OTHER APPLICATIONS

This application is a continuation of co-pending U.S. patent application Ser. No. 12/661,773, entitled SHAPE BASED PICTURE SEARCH filed Mar. 22, 2010 which is incorporated herein by reference for all purposes, which claims priority to People's Republic of China Patent Application No. 200910129551.7, entitled METHOD FOR IMPLEMENTING PICTURE SEARCH AND WEBSITE SERVER THEREOF filed Mar. 26, 2009, which is incorporated herein by reference for all purposes.

FIELD OF THE INVENTION

The present invention relates to the field of searching, and particularly to a method and system for implementing picture search.

BACKGROUND OF THE INVENTION

In existing picture search techniques, users typically input a search word in the search box and submit it to the search engine of a website. The search engine then searches among a large number of pictures obtained by a web crawler, for the searched keywords in the text associated with the pictures, such as the word in the filename or the subordinate field of the pictures. Further, the server returns to the users the pictures for which the filename or the subordinate field of the file attributes matches the keywords.

This type of picture search is essentially a text-content-based search. Pictures searched in this way are often not those really desired by the users. For example, among the picture search results that correspond to the searched keyword, users tend to desire pictures of a certain shape, for which the prior art picture search technologies do not account. Therefore, a picture search that takes the shape of the desired pictures into account may be advantageous.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A picture search technique is disclosed. In some embodiments, a web server classifies pictures in the database based on keywords and according to the shapes of the objects in the pictures.

Figure 1A:
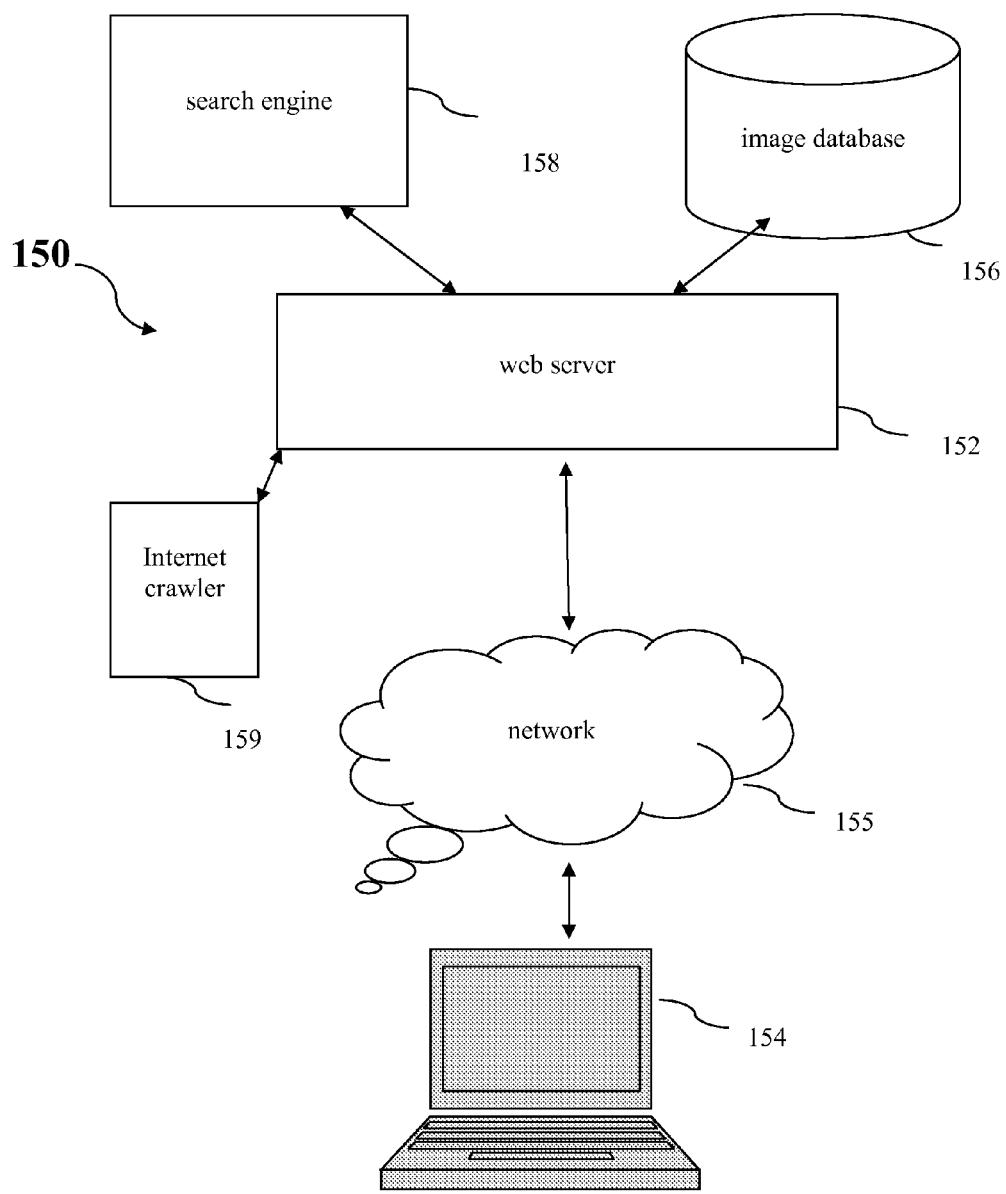
FIG. 1A is a block diagram illustrating an embodiment of an image searching system.

FIG. 1A is a block diagram illustrating an embodiment of an image searching system. In the example shown, image searching system 150 includes an image searching web server 152, which in some embodiments includes one or more devices having one or more processors coupled to one or more memories. Image searching web server 152 includes one or more interfaces configured to receive user inputs, for example, user inputs sent by client devices 154 over a network 155, which may be the Internet or other communications network. Examples of a communication interface include without limitation external connections, such as a port, cable, wire line, or wireless network interface card, etc., and internal connections, such as a communication bus. The image searching web server 152 receives images from an Internet crawler 159. In some embodiments, the client device is a computing device such as a computer or mobile device with networking capacities. Image searching web server 152 has access to image database 156 which stores images pre-classified by shapes. Images stored in image database 156 may be uploaded by users through a website, imported from other systems, grabbed by an Internet crawler 159 from a huge number of web pages, or obtained by other means.

As described in greater detail below, upon receiving user input of an image search request by keywords or sample images, the image search web server 152 processes the user input, searches for specific content which may be pre-classified by shape and/or keywords and stored in the image database 156, retrieves and returns to the user the search results based on the keywords or sample images.

In some embodiments, a website server has access to a picture database for storing picture data. The picture database may store a large number of pictures. Pictures stored in the picture database may be obtained, for example, from one or more of the following methods: uploaded by users of the website, imported from other systems, and/or used a web crawler to grab pictures from a large number of web pages. Each stored picture also includes the filename of the picture and possibly associated text content in the picture attributes. Both the filename of the picture and associated text content in the picture attributes may indicate specific content that is present in the picture. For example, for a picture displaying an MP3 player entity, the word "MP3" is typically included in the filename of the picture and/or associated text content in the picture attributes.

The website server classifies pictures by keywords. If such classification occurs in advance to a search, then the server may classify pictures in a pictures database. If such classification occurs after a search takes place, then the server may classify the found pictures. In some embodiments, the keywords may be predetermined. For example, the website server may classify the pictures including the keyword "MP3" in the filename of the picture and/or subordinate text content in the picture attributes into one set while classifying pictures including other keywords in the filename of the picture and/or subordinate text content in the picture attributes into other sets. The website server may extract, in advance of a search, from the picture database, a certain number of pictures with the same text keywords. For example, the website server may extract 1,000 pictures that include the keyword "MP3" in the filename of the picture and/or associated text content in the picture attributes. In some embodiments, these extracted pictures may be the 1,000 most selected pictures by the users as recorded by the website server so as to ensure the representativeness of the extracted pictures. In some embodiments, the extracted pictures already belong to the same set of pictures that was classified based on keywords.

Further, the website server may classify the extracted pictures by the shape characteristic of the pictures. Shape characteristics may include typical shape types, such as squares, circles, ellipses, for example. Returning to the above example of 1,000 pictures containing MP3 player entities (herein sometimes referred to as "MP3 pictures"), these 1,000 pictures may be classified into several shape types based on the shape of the objects included in the pictures. In the example, shape type classifications may include, but is not limited to, the following types: round-shaped MP3 pictures, rhombus-shaped MP3 pictures, square-shaped MP3 pictures, and rectangular MP3 pictures.

In some embodiments, the classification of pictures based on their shapes may be implemented by comparing the characteristic values of the pictures. Various techniques for evaluating the characteristic values are implemented in different embodiments. Example techniques may be found in co-pending U.S. patent application Ser. No. 12/658,471 entitled METHOD AND SYSTEM FOR IMAGE FEATURE EXTRACTION filed Feb. 9, 2010, which is incorporated herein by reference for all purposes.

In some embodiments, each characteristic value of a picture is extracted mathematically to express the characteristic of the picture that indicates the shape of the picture's displayed object. There are several solutions for extracting such picture shape characteristic. The extracted characteristic value of the pictures may typically be expressed by a vector with certain dimensions such as vector (P1, P2, ..., Pn) with n dimensions. Thus, the shape characteristic of the object in the picture is described by this vector. Specific extracting methods may include Hough transform, the description of which is omitted herein. In addition, a preferable image characteristic extracting method is briefly described below:

A1: cropping a picture of the target object from an original picture;

A2: filling around the boundary of the cropped picture with a single color as its background, and making the filled picture with the target object a minimal square;

A3: zooming, with equal scaling, the entire square picture into a picture with a first predetermined size and dividing the zoomed picture into sub-squares, where each sub-square is of a second predetermined size;

A4: calculating the derivatives of brightness of adjacent pixels in horizontal, vertical, +45° and −45° directions, respectively, and taking, as the characteristic vector of each sub-square of picture, the number of extremum points of the derivatives in the 4 directions and the number of extremum points in the 4 boundaries of this sub-square;

A5: taking the characteristic vectors of all the sub-squares as the characteristic vectors of the original picture.

The above picture characteristic extracting method primarily takes into account the pixel brightness differences between the edge portion and the surrounding background, etc. of the object displayed in the picture to find the edge of the object. Thus, the method extracts and acquires the shape characteristic of the object in the picture, which may then serve as the characteristic value extracted from the entire picture. The picture characteristic value expressed by this method is a vector with certain dimensions (e.g. vector (P1, P2, ..., Pn) with n dimensions), which may accordingly describe the shape characteristic of the object in the picture.

Other appropriate methods may be used to calculate the characteristic value of a picture that expresses its displayed object shape.

For example, regarding the aforementioned 1,000 extracted pictures that include the text "MP3", the server may compare the characteristic values of the 1,000 pictures and classify the pictures with similar characteristic values into a set of pictures of identical or similar shape type. In some embodiments, the server may set a predetermined range, where pictures whose differences of characteristic values fall within the predetermined range are classified as a set of pictures of identical or similar shape type.

In some embodiments, the differences of characteristic values are acquired by finding the distance of the vector expressing the characteristic values.

As an example of finding distances: for Point A1(x1, y1) and Point A2(x2, y2) on the two-dimensional plane, the distance between the points may be acquired by the formula $\sqrt{(x1-x2)^2+(y1-y2)^2}$ while considering the coordinates of the two points A1 and A2, i.e. (x1, y1) and (x2, y2) as two two-dimensional vectors. As to Point B1(x1, y1, z1) and Point B2(x2, y2, z2) in the three-dimensional coordinate, the distance between the points may be acquired by the formula $\sqrt{(x1-x2)^2+(y1-y2)^2+(z1-z2)^2}$ while considering the coordinates of these two points B1 and B2, i.e. (x1, y1, z1) and (x2, y2, z2) as two three-dimensional vectors. Similarly, as to n-dimensional vectors, the distance between these two vectors may be acquired by the formula $\sqrt{(P1-Q1)^2+(P2-Q2)^2+...+(Pn-Qn)^2}$, wherein these two vectors are (P1, P2, ..., Pn) and (Q1, Q2, ..., Qn), respectively.

For example, several typical shapes among these 1,000 pictures relating to "MP3" are acquired, and for each typical shape, a picture may be selected as the sample picture of this typical shape. For example, the sample pictures of typical shapes may include a selected picture from each of round-shaped MP3 pictures, rhombus-shaped MP3 pictures, square-shaped MP3 pictures, and rectangular MP3 pictures.

This sample picture may be one picture among all the pictures of the same shape type as designated by the website maintenance staff or as designated by the server according to a certain standard. The selection of this sample picture is not particularly limited herein. In some embodiments, a marker is added to the selected sample picture in order to conveniently return to the marked sample pictures.

In addition, in the event that the characteristic value of the sample picture of a typical shape has not already been determined, the characteristic value of the sample picture of the typical shape may be obtained in a manner similar to the calculation of the characteristic value of each picture as described above. In some embodiments, the website server may extract the characteristic value of the designated sample picture after receiving this sample picture.

In some embodiments, the above classification of shape types for pictures relating to the same text keyword is carried out by the server, but the classification may be carried out manually as well.

After extracting 1,000 pictures relating to "MP3", for example, it is possible to manually obtain sample pictures of several typical shape types of the 1,000 pictures by the website operating staff. It is even possible to manually select sample pictures of several typical shape types from the pictures relating to "MP3" directly by the website operating staff.

With regards to classifying in advance of a search, the shape types of pictures relating to keywords in the picture database, the website operating staff may manually sort sample pictures so that, for example, sample pictures of the shape type more likely to be the search target are arranged to show up earlier in the search results. The sample pictures may also be sorted by the website server so that, for example, sample pictures corresponding to the shape types containing a larger number of pictures are arranged to show up earlier in the search results.

In some embodiments, classifying the shape types of pictures relating to keywords in the picture database and determining the sample pictures for each shape type occur prior to a server receiving a picture search request.

In the embodiments discussed below, the server pre-processes the data in the picture database, including by classifying pictures in the picture database by as many keywords as possible, classifying the pictures relating to a keyword according to several basic shape types, and selecting a sample picture for each classified shape type. Upon receiving a search request sent from the client, the server directly searches for whether the associated text of pictures in the picture database and the keyword in the search request are identical or are sufficiently related. If such matching exists, then the server enables the client to select one among the sample pictures of various shapes corresponding to the matched keyword, and immediately returns the pictures from the picture database that correspond to the shape of the selected sample picture. These embodiments may be particularly convenient and useful to a small scale website where the picture database is not quite large in scale and not quite frequently updated. Even in case the website is frequently updated, the same search results may be realized as long as the website server can perform preprocessing in advance at the same frequency. More detailed descriptions of the processing may be found below.

Figure 1B:
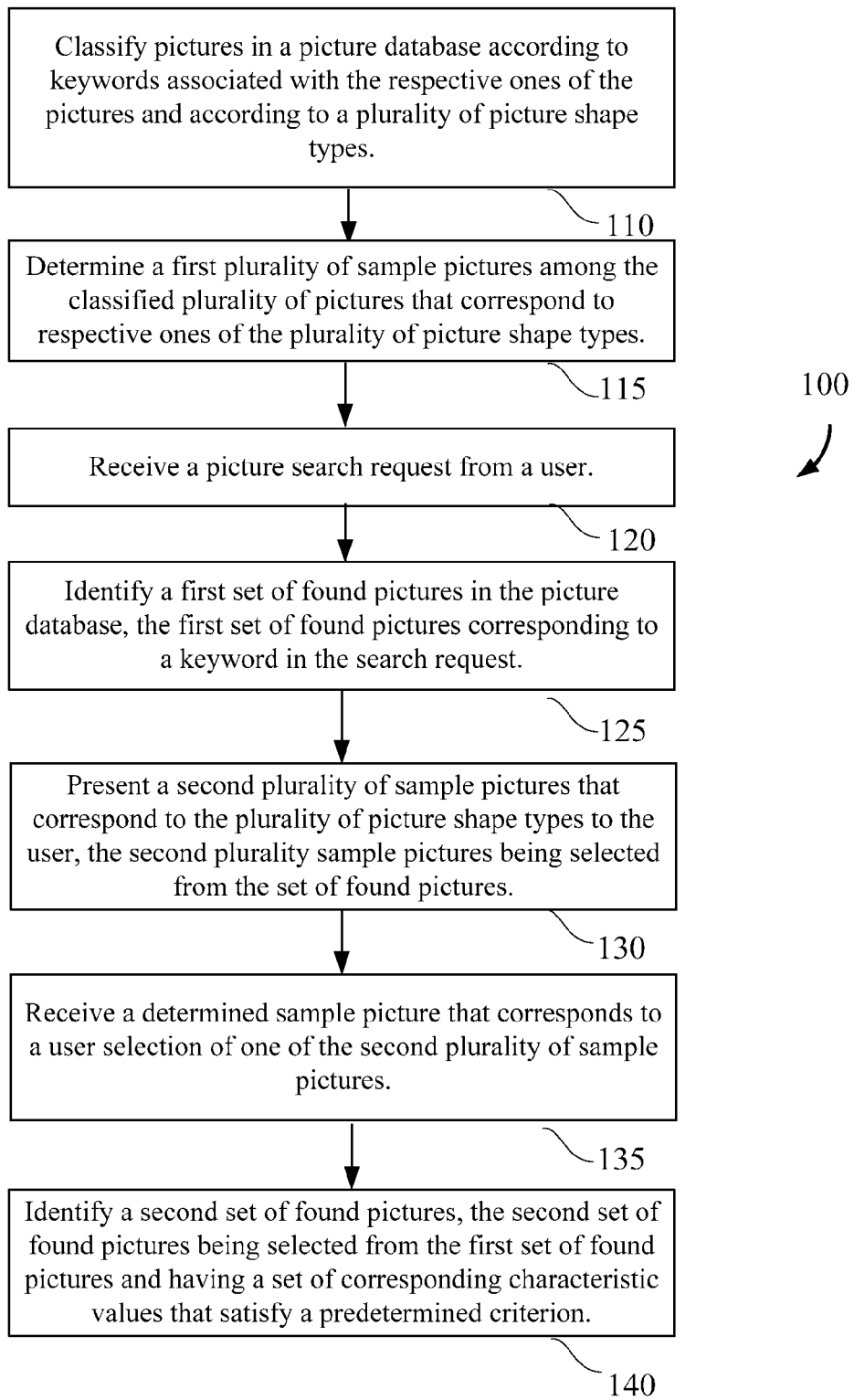
FIG. 1B is a flowchart of a first embodiment of a process for implementing picture search.

FIG. 1B shows a flowchart of a first embodiment of a method of implementing a picture search. Method 100 may be performed on a system such as 150.

At 110, pictures are classified in a picture database according to keywords associated with the respective ones of the pictures and according to a plurality of picture shape types. The number of shape types may be determined by the outcome of classifying the pictures corresponding to the keywords by their shapes. In some embodiments, the classification of pictures by shapes may take place by comparing the characteristic values of the pictures. In some embodiments, the number of shape types is predetermined.

Returning to the MP3 pictures example: some pictures in the picture database may be first classified as having associated text that corresponds to the keyword "MP3." These pictures that correspond to "MP3" may then be further classified into sets according to their picture shape types. Picture shape types may include, for example, round, square, and rectangular. To summarize, after 110, there may be a set of pictures that correspond to the keyword "MP3" and the set may be further classified into subsets of pictures according to their picture shape types.

At 115, a first plurality of sample pictures among the classified plurality of pictures that correspond to respective ones of the plurality of picture shape types is determined. For each picture shape type, a picture may be selected among the set of pictures of this shape type as the sample picture of this shape type.

This sample picture may be designated by the website maintenance staff or designated by the server according to a certain standard. The selection of this sample picture is not particularly limited herein. In some embodiments, a marker is added to each selected sample picture in order to conveniently return to the marked sample pictures.

Returning to the MP3 pictures example: among the pictures that are classified to correspond to the keyword "MP3," the determined sample pictures of the picture shape types may include a selected picture from each of round-shaped MP3 pictures, square-shaped MP3 pictures, and rectangular-shaped MP3 pictures.

At 120, a picture search request from a user is received. For example, a website server may receive a picture search request from a user when the user queries a search in a search engine.

Returning to the MP3 pictures example: a website server may receive the search request of the keyword "MP3" from a user.

At 125, a first set of found pictures in the picture database is identified. Here, the first set of found pictures corresponding to a keyword in the search request.

In the picture database, pictures whose filename and/or associated text content in the picture attributes include a certain keyword are pre-classified by their shape types through the above described means. Additionally, in the picture database, sample pictures have already been selected for each set of pictures as classified by their shape types. As a result, if the keyword in the received search request and a certain keyword relating to a picture are identical, or are sufficiently related, (e.g. where the keyword in the received search request is included in a certain keyword relating to the picture or where a certain keyword relating to the picture is included in the keyword in the search request) then the server can easily find the set of pictures of the several shape types, whose corresponding keyword is identical to or is sufficiently related to the keyword in the search request.

Returning to the MP3 pictures example: the server may identify pictures in the picture database that were classified in 110 to correspond to the keyword "MP3".

At 130, a second plurality of sample pictures that correspond to the plurality of picture shape types to the user, the second plurality sample pictures being selected from the set of found pictures are presented. For example, since sample pictures have already been determined in 115, a server may locate the sample pictures among the first set of found pictures based on the markers placed on such pictures.

Returning to the MP3 pictures example: among the found pictures that correspond to the keyword "MP3," the server may present to the user the sample pictures from each of round-shaped MP3 pictures, square-shaped MP3 pictures, and rectangular MP3 pictures.

At 135, a determined sample picture that corresponds to a user selection of one of the second plurality of sample pictures is received. Hereinafter, the sample picture of the shape type as selected by the user is also referred to as the "determined sample picture." A user may further customize his or her picture search by selecting his or her desired shape of picture in 135. In some embodiments, a corresponding identifier of the sample picture is received instead of the picture itself.

Returning to the MP3 pictures example: assuming that the user desires to find MP3 pictures of a round shape, then the user may select the round-shaped MP3 sample picture among the presented sample pictures. The server may then receive this determined sample picture or its corresponding identifier.

At 140, a second set of found pictures are identified, where the second set of found pictures are selected from the first set of found pictures and have a set of corresponding characteristic values that satisfy a predetermined criterion. The picture database is thus searched for the pictures that correspond to the search keyword(s) and whose characteristic values also satisfy a predetermined criterion. In some embodiments, the predetermined criterion is based on the determined sample picture. An example of a predetermined criterion may be a predetermined distance from the characteristic value vector of the determined sample picture. For example, when the characteristic value of the pictures is in vector format, it is possible to search in the picture database for the pictures whose characteristic value vectors are at distances from the characteristic value vector of the determined sample picture that are below a predetermined threshold.

Returning to the MP3 pictures example: the server may search among the found pictures that correspond to "MP3" for those pictures whose characteristic value vectors are also at distances from the characteristic value vector of the determined sample picture that are below a predetermined threshold. This search may find more MP3 pictures of a round shape.

In some embodiments, the specific searching method may be performed by calculating the distance between the characteristic value vector of the determined sample picture and the characteristic value vector of each of the pictures in the picture database. As described earlier, for two n-dimensional vectors, the distance between these two vectors may be acquired by the formula $\sqrt{(P1-Q1)^2+(P2-Q2)^2+...+(Pn-Qn)^2}$, wherein these two vectors are (P1, P2, ..., Pn) and (Q1, Q2, ..., Qn), respectively. Suppose that (P1, P2, ..., Pn) is the characteristic value vector of the determined picture and (Q1, Q2, ..., Qn) is the characteristic value vector of a certain picture in the picture database, then their distance may be acquired by the above formula. Typically, pictures with zero distance between their respective vectors are considered to be pictures of the same shape, whereas pictures with a distance within a certain range may be considered as pictures of similar shape. This range may be set by said predetermined threshold. For example, a threshold set as 10 means that any pictures whose characteristic value vector from the determined picture is within a distance of 10 becomes included in the search results (i.e., pictures of identical or similar shape of the determined picture). Thus, pictures from the picture database of identical or similar shape to the determined sample picture are sent to the user.

In some embodiments, searching the picture database according to 140 includes first searching in the picture database for pictures whose characteristic value vectors are within a predetermined distance of the characteristic value vector of the determined sample picture keyword, and then filtering the found pictures to obtain pictures whose filenames and/or associated text content in the picture attributes include keywords of the search request. In some embodiments, 140 includes first searching in the picture database for the pictures whose filenames and/or associated text content in the picture attributes include the search keyword, and then filtering the found pictures for the pictures whose characteristic value vectors comes within a predetermined distance within the characteristic value vector of the determined sample picture.

After 140, the found pictures that are displayed in the search results should all satisfy the user's search. For example, if the user submits a search request for a keyword of "MP3", then in 135, the user may select the "MP3" sample picture of a certain shape (e.g. round shape) from the set of sample pictures of different shape types that are returned by the server. As a result of the selection and subsequent searching from 140, pictures displayed in search results are all "MP3" pictures of round shapes.

The server may return to the client the found pictures in the descending order of the number of times on which each of the found pictures has been selected. Typically, the picture database will record the number of times on which each of its pictures has been selected (or have been accessed). In some embodiments, the pictures that are the most frequently selected are of greater interest to users than those that are less frequently selected. Therefore, returning the pictures that are most frequently selected first will more likely satisfy the user's search demand.

After 140, the user will often select a specific picture among the found pictures and the server may then record the specific picture on which the user selected to count the number of selections of the specific picture. Accordingly, the number of times on which each picture has been selected by users may be accumulated by the server. Thus, the history of picture selection by users provides feedback for picture search.

In the above described first embodiment, after the server receives the picture search request sent from the client, the server searches in the picture database, which has already been classified by keywords and into sets of typical shapes, for the sample picture of several shape types corresponding to the keywords in the search request, and returns to the client the searched sample picture of each of the several shape types; the server receives the sample picture of a certain shape type as determined by the client, and searches in the picture database for the pictures whose characteristic value vectors comes within a predetermined distance within the characteristic value vector of the determined sample picture; the server returns to the client said found pictures. The first embodiment may search pictures according to user's intention and particularly may provide the picture shape types corresponding to the user's search keywords, and further may search pictures of similar shapes according to the shape type selected by the user, thereby satisfying the user's search demands and enhancing the user's experience.

As described above, the goal of extracting the sample pictures of typical shapes in advance is to extract pictures having typical shapes and relating to a certain keyword in the picture database. Since these typical shape types usually remain unchanged for a long period, such extracting only needs to be executed occasionally. As to data in the picture database, however, due to the uncertainty of the time at which the users upload pictures and the high frequency at which the web crawler grabs pictures on the Internet, the server should, after receiving the picture search request from the users, immediately perform 140 to search for pictures in the picture database, so as to ensure that even the most recent pictures are included into the search result.

The second embodiment of the method for implementing picture search is described below. The description about the second embodiment focuses mainly on the differences from the first embodiment while leaving the similarities to be referred to the above description. One difference from the first embodiment is, for example, the absence of further searches in the picture database for the pictures whose characteristic value vectors comes within a predetermined distance of the characteristic value vector of the sample picture as determined by the user. Instead, the second embodiment returns pictures in the picture database which are of identical or similar shape type to the sample picture as determined by the client without the aforementioned further search in the picture database based on a predetermined distance.

As described above, the website server may classify, in advance of a search, pictures in the picture database based on their corresponding keywords. In some embodiments, the keywords may be predetermined keyword.

Figure 2:
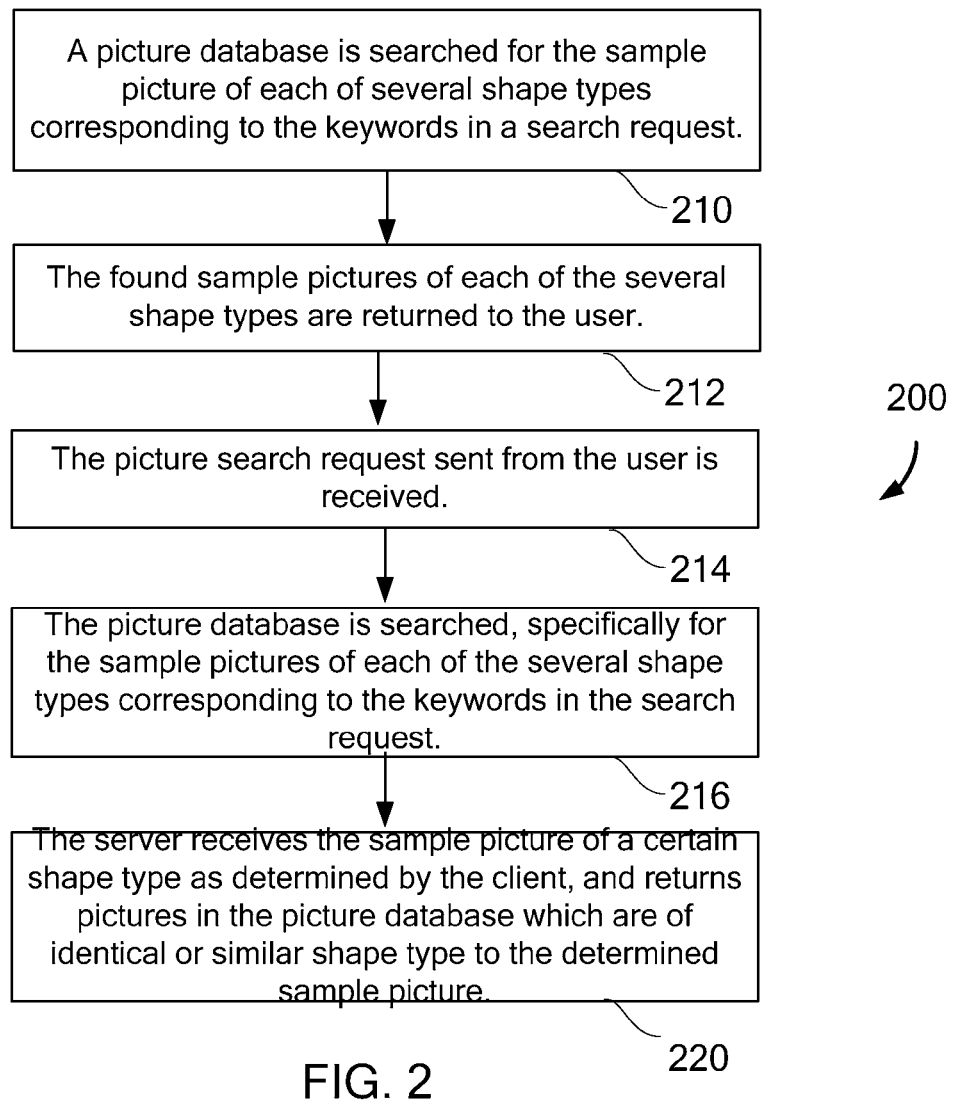
FIG. 2 is a flowchart of a second embodiment of a process for implementing picture search.

FIG. 2 shows a flowchart of a second embodiment of a method of picture search. Method 200 may be performed on system 600.

At 210: a picture database is searched for the sample picture of each of several shape types corresponding to the keywords in a search request. The picture database is pre-classified as described above in connection with FIG. 1.

At 212, the found sample pictures of each of the several shape types are returned to the user.

At 214, the picture search request sent from the user is received.

At 216, the picture database is searched, specifically for the sample pictures of each of the several shape types corresponding to the keywords in the search request. This may include searching for the sample picture of each of the several shape types, classified in advance of a search, in the picture database which includes the keywords in said search request.

In the picture database, pictures whose filename and/or subordinate text content in the picture attributes include a certain keyword have already been classified by shape types by the above described means. Additionally, in the picture database, sample pictures have already been selected for each set of pictures classified by their shape types. As a result, if the keyword in the received search request and a certain keyword relating to a picture of the picture database are identical, or are sufficiently related, (e.g. where the keyword in the received search request is included in a certain keyword relating to the picture or where a certain keyword relating to the picture is included in the keyword in the search request) then the server may easily find the sample picture of each set of pictures classified by their shape types, whose associated keyword is identical to or is sufficiently related to the keyword in the search request. Further, the server may return the searched sample picture of each of the several shape types for the client to select a desired shape type of the desired pictures. Hereinafter, the sample picture of a certain shape type as selected by the client may sometimes be referred to as the "determined sample picture."

At 220: the server receives the sample picture of a certain shape type as determined by the client and returns pictures in the picture database which are of identical or similar shape type to the determined sample picture.

The server may return to the client the found pictures in the descending order of the number of times on which each of the pictures were selected.

In this example, after the server receives the picture search request sent from the user, the server searches in the picture database, which has already been classified by keywords and into sets of typical shapes, for the sample picture of each of several shape types corresponding to the keywords in the search request, and returns to the user the searched sample picture of each of the several shape types; the server receives the sample picture of a certain shape type as determined by the client keyword and returns pictures in the picture database which are of identical or similar shape type to the submitted sample picture. Thus, the second embodiment may return found pictures according to the user's intention and particularly may provide the picture shape types corresponding to the user's search keywords, and further may return the found pictures of similar shapes according to the shape type selected by the user, thereby satisfying the user's search demands and enhancing user's experience.

Figure 3:
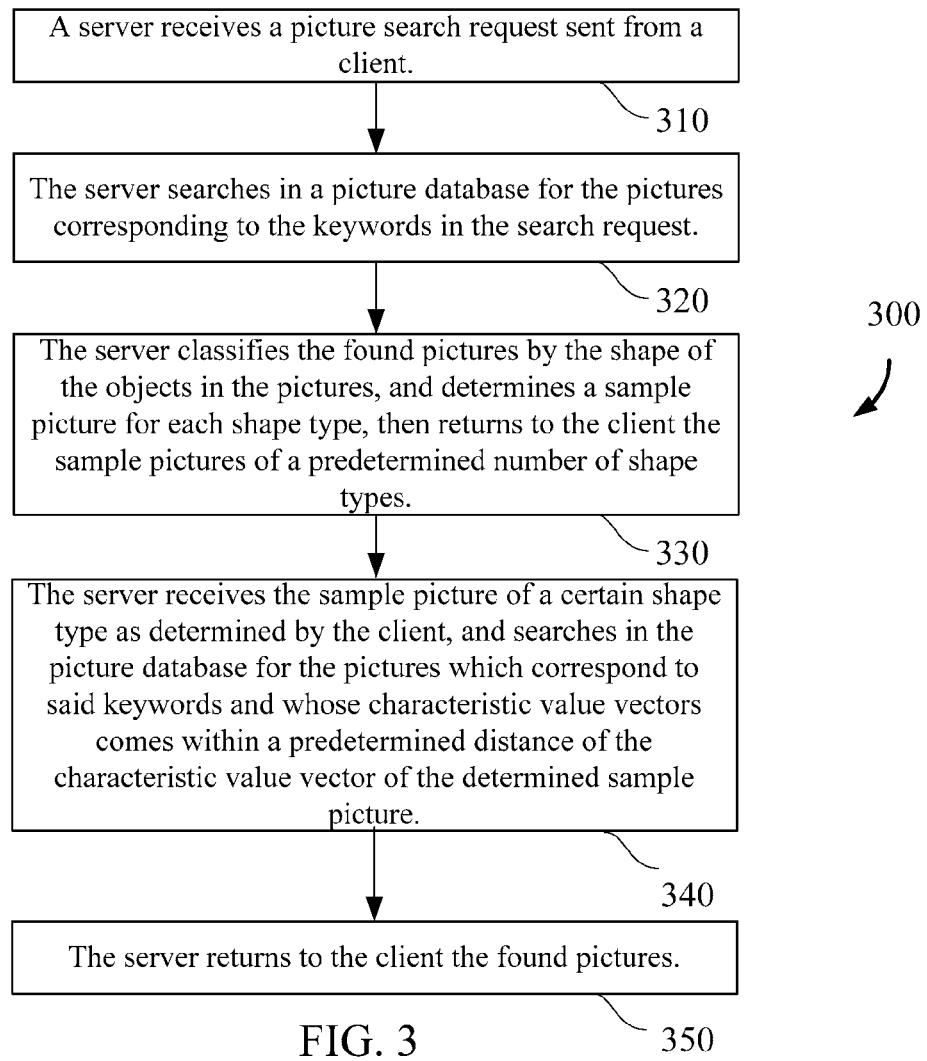
FIG. 3 is a flowchart of a third embodiment of a method for implementing picture search of the present application.

FIG. 3 shows a flowchart of a third embodiment of a method of picture search. The above description of terminology may be applicable for the third embodiment as well. Unlike the previous two embodiments, neither the third nor fourth embodiments performs pre-processing such as classifying pictures in the picture database by as many keywords as possible, classifying the pictures relating to a keyword by their shape types, and selecting sample pictures for each shape in advance of a search. Instead, in the third embodiment and also the fourth embodiment, such processing is performed after a search is queried. Method 300 may be performed on system 700.

At 310, a server receives a picture search request sent from a client. The picture search request sent from the client may include a text keyword, which requests a picture whose filename or associated text content in the picture attributes includes the keyword of the search request.

At 320: the server searches in a picture database for the pictures corresponding to the keywords in the search request. The server may search, in the picture database, a predetermined number of pictures whose filename and/or associated text content in the picture attributes include the keyword of the search request. For example, if the search request includes the keyword "MP3", and the predetermined number of pictures is 1,000, then the server may search 1,000 pictures whose filename and/or associated text content in the picture attributes of the picture database include this keyword. In some instances, the predetermined number of pictures is fewer than all the pictures in the picture database whose filename and/or associated text content in the picture attributes include the keyword.

In this third embodiment, the reason for searching in the picture database among only a predetermined number of pictures keywords rather than all the pictures corresponding to the keywords in the search request is to extract the most typical pictures and then to classify such pictures into sets of different shape types. As used herein, "typical" may refer to a high frequency of times a certain picture has been accessed by Internet users. Subsequently, after extracting and classifying the pictures, the client selects a desired shape type of a picture and then a wider range search is performed based on this determined shape type. Therefore, the purpose of searching more typical pictures corresponding to the keyword of the search request is to still classify the shape types of found pictures while keeping the execution period short to reduce the time of the entire searching process.

At 330: the server classifies the found pictures by the shape of the objects in the pictures and determines a sample picture for each shape type, then returns to the client the sample pictures of a predetermined number of shape types. In some embodiments, the predetermined number of shape types is at most the number of classified shape types.

The server classifies the pictures searched in 320 by shape of the pictures into, for example, several typical shape types. Returning to the example of MP3 pictures, the found pictures in response to a query including the keyword "MP3" may be classified into several shape types such as the following: round-shaped MP3 pictures, rhombus-shaped MP3 pictures, square-shaped MP3 pictures, and rectangular-shaped MP3 pictures.

As to classification of the pictures by their shapes, for example, the classification of pictures by their shapes may be implemented by comparing the characteristic values of the pictures. The method of comparing characteristic values of pictures to determine the shape types of the pictures is similar to that which is described in the first embodiment above.

For example, for 1,000 found pictures including the text "MP3", the server may compare the characteristic values of the 1,000 pictures and classify the pictures with similar characteristic values into a set of pictures of identical or similar shape type. For example, the server may set a predetermined range to set pictures whose differences of characteristic values fall within the predetermined range as one set of pictures of identical or similar shape type.

As described above, the differences of characteristic values may be acquired by finding the distances of the vectors expressing characteristic values. Thereafter, the server may select one picture for each typical shape as the sample picture of this typical shape. Furthermore, the server may return to the client the sample pictures of a predetermined number of shape types.

The client receives the sample pictures of a predetermined number of shape types sent from the server. Then the user may select one of the sample pictures, which indicates that the user intends to search for a picture having the specific shape of the determined sample picture. This determined sample picture is then submitted to the server via the network.

At 340, the server receives the sample picture of a certain shape type as determined by the client and searches in the picture database for the pictures which correspond to the keywords and whose characteristic value vectors comes within a predetermined distance of the characteristic value vector of the determined sample picture.

As described above, when the characteristic value of the pictures is in vector format, it is possible to search in the picture database for the pictures whose characteristic value vectors are at distances from the characteristic value vector of the determined picture that are below a predetermined threshold.

Also as described above, the specific searching method may be performed by calculating the distance between the characteristic value vector of the determined picture and the characteristic value vector of each picture in the picture database.

In some embodiments, 340 may involve first searching for the pictures whose characteristic value vectors comes within a predetermined distance of the characteristic value vector of the determined sample picture, and then filtering the found pictures to obtain pictures whose filename and/or associated text content in the picture attributes includes keywords of the search request. In some embodiments, 340 may involve first searching for the pictures whose filename and/or associated text content in the picture attributes include the keyword, and then filtering the search pictures for the pictures whose characteristic value vectors comes within a predetermined distance of the characteristic value vector of the determined sample picture.

At 350: the server returns to the client the found pictures.

In 350, the server may return to the client the found pictures in the descending order of the number of times on which each of the found pictures has been selected. After 350, pictures of the search result as displayed by the client should all satisfy the user's desired search. For example, if the user submits a search request for a keyword of "MP3", then in 330, the user may select the "MP3" sample picture of a certain shape, such as a round shape, from the set of shape types returned by the server and as a result, in 350, pictures as displayed in the search results that are received by the client are all "MP3" corresponding pictures of a round shape.

As can be seen from the above description of the third embodiment, the server receives the picture search request sent from the client; the server searches in the picture database for the pictures corresponding to the keywords in said search request; the server classifies the found pictures by the shape of the objects in the pictures and determines a sample picture for each shape type, then returns to the client the sample pictures of a predetermined number of shape types; the server receives the sample picture of a certain shape types as determined by the client, and searches in the picture database for the pictures whose characteristic value vectors comes within a predetermined distance of the characteristic value vector of the determined sample picture. Thus, the third embodiment may search pictures according to the user's intention and particularly may provide the picture shape types corresponding to the user's search keywords, and further may search pictures of similar shapes according to the shape type as determined by the user, thereby satisfying the user's search demands and enhancing the user's experience.

This third embodiment requires that the server be provided with relatively high software and hardware access speeds and high processing capability in a case of a large scale picture database.

Figure 4:
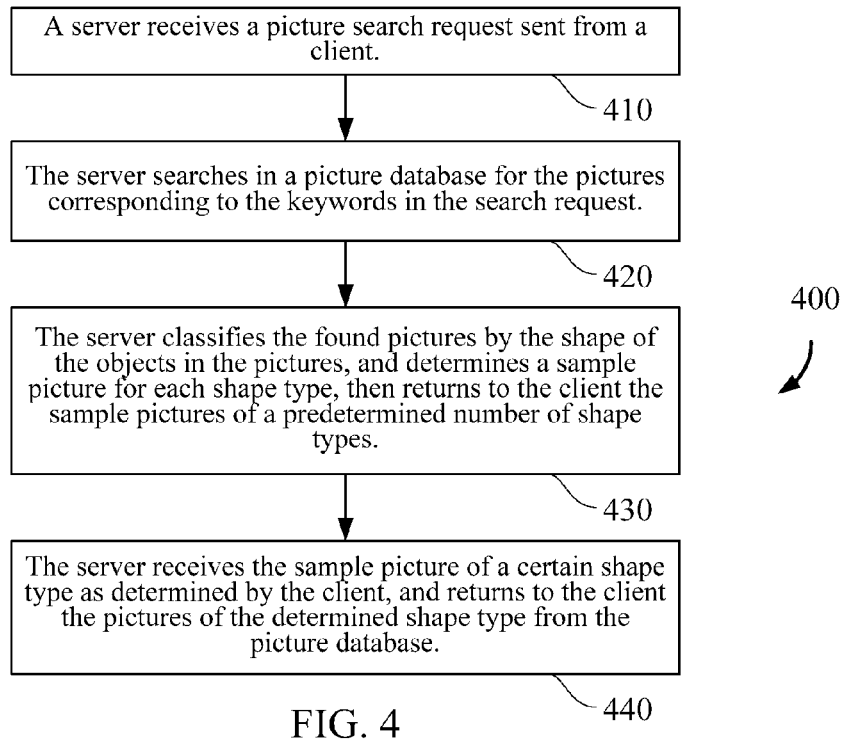
FIG. 4 is a flowchart of a fourth embodiment of a method for implementing picture search.

FIG. 4 shows the flowchart of the fourth embodiment of the method of picture search. One difference from the third embodiment is, for example, the absence of further searches for the pictures whose characteristic value vectors comes within a predetermined distance within the characteristic value vector of the sample picture as determined by the client. Instead, the fourth embodiment returns pictures in the picture database which are of identical or similar shape type to the sample picture as determined by the client without the aforementioned further search in the picture database. Method 400 may be performed on system 800. Method 400 includes:

At 410: a server receives a picture search request sent from a client.

The picture search request sent from the client includes a text keyword, which requests for pictures whose filename or associated text content in the picture attributes includes the keyword in the search request.

At 420: the server searches in a picture database for the pictures corresponding to the keywords in the search request.

The picture database stores a large number of pictures. As described above, these pictures may be obtained by various means. Also as described above, each stored picture includes the filename of the picture and associated text content in the picture attributes.

At 430: the server classifies the found pictures by the shape of the objects in the pictures, and determines a sample picture for each shape type, then returns to the client the sample pictures of a predetermined number of shape types.

The server may classify the pictures searched in 420 by the shape characteristic of the pictures into, for example, several typical shape types, as per descriptions above.

The classification of the pictures by their shapes may be implemented by comparing the characteristic values of the pictures. The method of comparing the characteristic value to determine the shape types of the pictures is similar to that described in the first embodiment above.

Thereafter, the server may select one picture for each typical shape as the sample picture of this typical shape. Further, the server returns to the client the sample pictures of a predetermined number of shape types. In some embodiments, the predetermined number of shape types is at most the number of classified shape types.

Furthermore, the server may only extract a certain number of pictures from the pictures corresponding to the keywords in the search request. In some embodiments, the certain number is fewer than all the pictures corresponding to the keywords of the search request. For example, the server may only extract 1,000 pictures, then classifies these 1,000 pictures by the shape of the objects in the pictures, determines a sample picture for each shape type, and then returns to the client the sample pictures of the predetermined number of shape types, thereby improving search efficiency by searching fewer than all the pictures that may correspond to the keywords of the search request.

At 440: the server receives the sample picture of a certain shape type as determined by the client, and returns to the client the pictures of the determined shape type from the picture database.

The client receives the sample pictures of a predetermined number of shape types sent from the server in 430, and then the user may select one of the sample pictures, which indicates that the user intends to search for a picture having the specific shape of the determined sample picture. This determined sample picture is then submitted to the server via the network.

Since the found pictures have already been classified corresponding to the keywords and shapes in 430, after the server receives the determined sample picture, it is possible to directly return the pictures of the shape type of the determined sample picture in 440.

For example, returning to the example of "MP3" keyword related pictures, if the client has selected a round-shaped "MP3" related picture, since the server has already classified the searched MP3 into several shape types in 410-430 in which a round shape type is included, the server may then directly return to the client the pictures classified as round-shape pictures corresponding to keyword "MP3." The server may return the pictures to the client in the descending order of the number of selections for the pictures.

As can be seen from the above fourth embodiment, the server receives the picture search request sent from the client; the server searches in the picture database for the picture corresponding to the keywords in the search request; the server classifies said found pictures by the shape of the objects in the pictures, determines a sample picture for each shape type, then returns to the client the sample pictures of a predetermined number of shape types; the server receives the sample picture of a certain shape type as determined by the client, and returns to the client the pictures of the shape type of the determined sample picture from the picture database. Thus, the fourth embodiment may search pictures according to the user's intention and, particularly, may provide the picture shape types corresponding to the user's search keywords and further may return pictures of a shape according to the shape type selected by the user, thereby satisfying the user's search demands and enhancing user's experience.

This fourth embodiment is applicable to a picture database which is not very large in scale. Thus, it may not take much time to classify the found pictures by the shape of the objects in the pictures during the whole searching process. Of course, the relatively high software/hardware access speed and processing capability of servers may as well be an important factor that affects the search efficiency.

Figure 5:
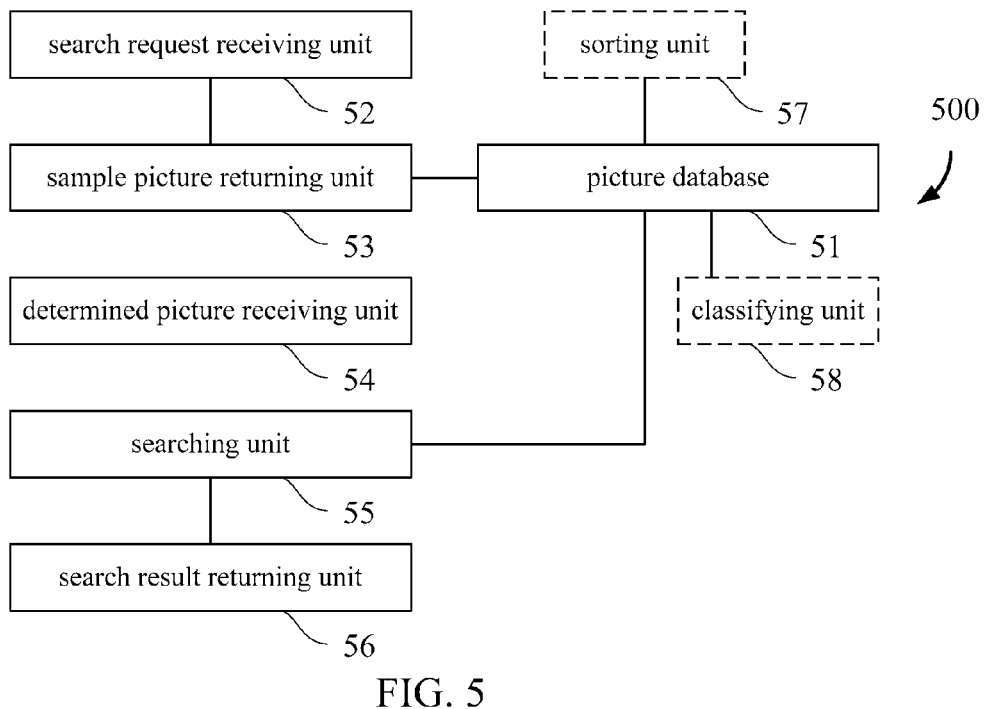
FIG. 5 is a block diagram of the first embodiment of the server for implementing picture search of the present application.

FIG. 5 shows the block diagram of an embodiment of a system for picture search. The units and sub units that comprise system 500 may be implemented as software components executing on one or more processors, as hardware such as programmable logic devices and/or Application Specific Integrated Circuits designed to perform certain functions or a combination thereof. In some embodiments, the units and sub units can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The units and sub units that comprise system 500 may be implemented on a single device or distributed across multiple devices. System 500 includes:

Picture database 51, in which pictures are stored, and the pictures corresponding to a same keyword are classified, in advance of a search, by the shapes of objects in the pictures and each set of pictures of a particular shape type has a determined sample picture;

Search request receiving unit 52, adapted to receive a picture search request sent from a client;

Sample picture returning unit 53, adapted to search in the picture database for the sample picture of each of several classified shape types corresponding to the keyword in the search request, and return to the client the searched sample picture of each of the several shape types;

Determined picture receiving unit 54, adapted to receive the sample picture of a certain shape type as determined by the client;

Searching unit 55, adapted to search in the picture database for the pictures which correspond to the keyword and whose characteristic value vectors comes within a predetermined distance of the characteristic value vector of the determined sample picture;

Search result returning unit 56, adapted to return to the client the found pictures.

In some embodiments, system 500 may further include sorting unit 57 adapted to sort the sample pictures in the picture database so that, for example, the sample pictures corresponding to the shape types containing larger numbers of pictures are sorted to appear earlier in the returned sample pictures.

In some embodiments, the pictures in the picture database include uploaded pictures and/or pictures grabbed by a web crawler from a large number of Internet web pages.

In some embodiments, system 500 may further include classifying unit 58 adapted to classify pictures in the picture database by the shapes of the objects in the pictures by comparing the characteristic value of the pictures.

In some embodiments, comparing the characteristic value of the pictures including classifying pictures whose differences of characteristic values fall within the predetermined distance into sets of pictures of identical or similar shape type.

In some embodiments, the pictures that come within a predetermined distance include pictures in the picture database whose characteristic value vectors are at distances from the characteristic value vector of the determined sample picture that are below the predetermined threshold.

The method for implementing picture search by means of system 500 is similar to the aforementioned first method embodiment.

Figure 6:
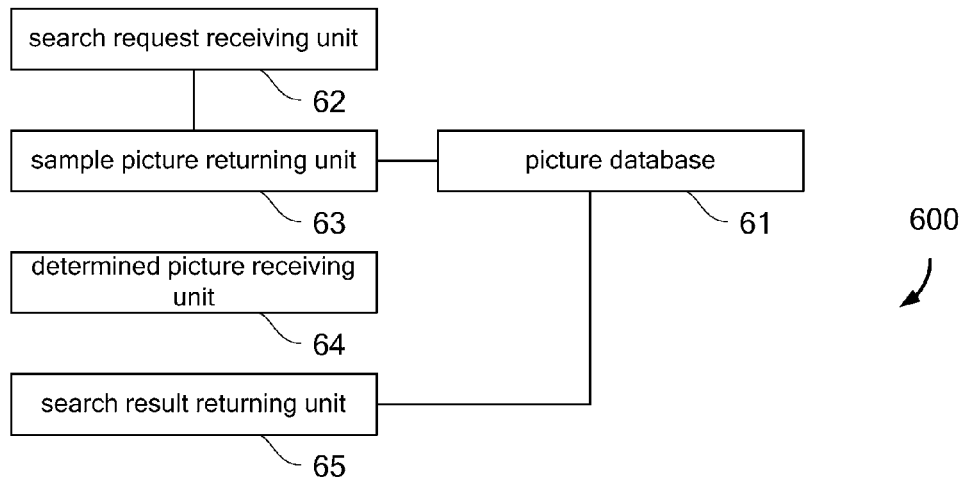
FIG. 6 is a block diagram of a system for picture search.

FIG. 6 shows an embodiment of a system for picture search. System 600 includes:

Picture database 61, in which pictures are stored, and the pictures corresponding to the same keywords are classified, in advance of a search, by the shapes of objects in the pictures and each set of pictures of a particular shape type has a determined sample picture;

Search request receiving unit 62, adapted to receive a picture search request sent from a client;

Sample picture returning unit 63, adapted to search in the picture database for the sample picture of each of several classified shape types corresponding to the keywords in the search request and return to the client a searched sample picture of each of the several shape types;

Determined picture receiving unit 64, adapted to receive the sample picture of a certain shape type as determined by the client;

Search result returning unit 65, adapted to return pictures in the picture database which are of identical or similar shape type to the determined sample picture.

The method for implementing picture search by means of system 600 is similar to the aforementioned second method embodiment.

Figure 7:
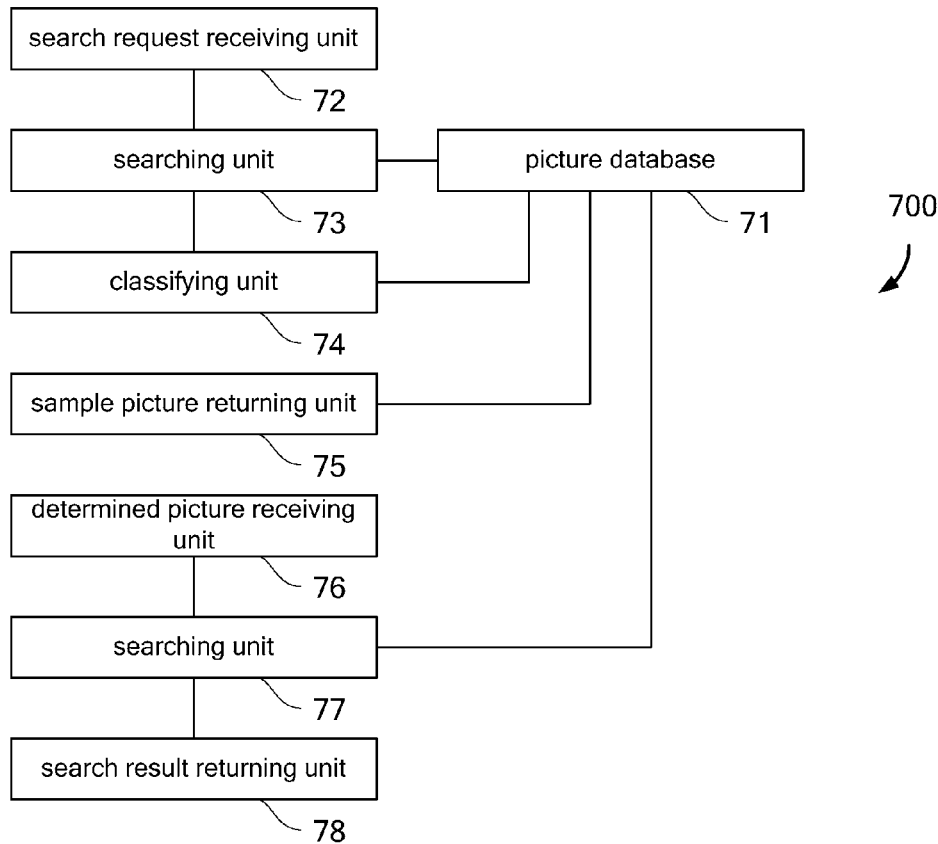
FIG. 7 is a block diagram of another embodiment of a system of picture search.

FIG. 7 shows another embodiment of a system of picture search. System 700 includes:

Picture database 71, in which pictures are stored;

Search request receiving unit 72, adapted to receive a picture search request sent from a client;

Searching unit 73, adapted to search in the picture database for the pictures corresponding to keywords in the search request;

Classifying unit 74, adapted to classify the found pictures by the shape of objects in the pictures;

Sample picture returning unit 75, adapted to determine a sample picture for each set of pictures of a particular shape type classified by said classifying unit and then return to the client the sample pictures of a predetermined number of shape types;

Determined picture receiving unit 76, adapted to receive the sample picture of a certain shape type as determined by the client;

Searching unit 77, adapted to search in the picture database for the pictures which correspond to the keywords and whose characteristic value vectors comes within a predetermined distance of the characteristic value vector of the determined sample picture;

Search result returning unit 78, adapted to return the found pictures.

The method for implementing picture search by means of system 700 is similar to the aforementioned third method embodiment.

Figure 8:
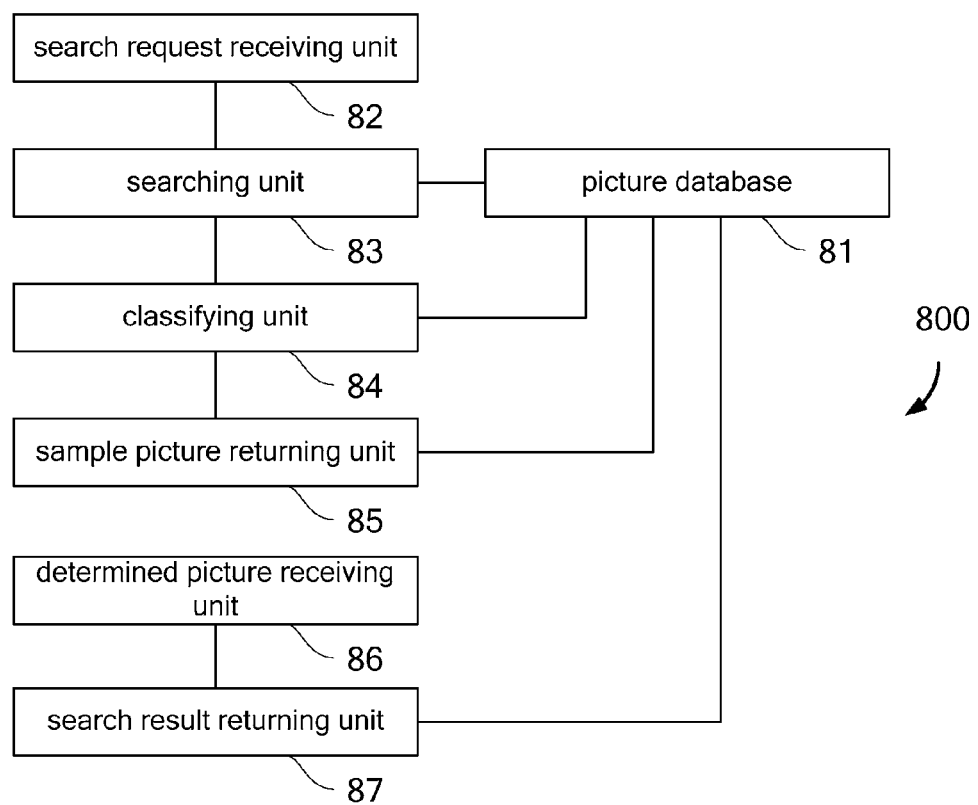
FIG. 8 shows an embodiment of a system of picture search.

FIG. 8 shows an embodiment of a system of picture search. System 800 includes:

Picture database 81, in which pictures are stored;

Search request receiving unit 82, adapted to receive a picture search request sent from a client;

Searching unit 83, adapted to search in the picture database for the pictures corresponding to keywords in the search request;

Classifying unit 84, adapted to classify the found pictures by the shapes of objects in the pictures;

Sample picture returning unit 85, adapted to determine the sample picture for each set of pictures of a particular shape type classified by the classifying unit and return to the client the sample pictures of a predetermined number of shape types;

Determined picture receiving unit 86, adapted to receive the sample picture of a certain shape type as determined by the client;

Search result returning unit 87, adapted to return pictures in the picture database which are of identical or similar shape type to the determined sample picture.

The method for implementing picture search by means of system 800 is similar to the aforementioned fourth method embodiment.

In the description about the above means, for the sake of convenience, the description is made by different units according to the functions thereof. Of course, when implementing the embodiments, the functions of each unit may be implemented in one or more software and/or hardware.

Those skilled in the art may, from the above description about the embodiments, clearly understand that the present invention may be realized by means of software combined with necessary general-purpose hardware platform. Based on this concept, the spirit of the technical solutions of the embodiments of the invention or, in other words, the contents which contribute to improve the prior art may be embodied by means of computer software products that may be stored in such storage media as ROM/RAM, magnetic disk, optical disc, etc. and which include several instructions to make a computer apparatus (which may be a personal computer, server or network device, etc.) execute some embodiments of the present invention.

Embodiments of the present invention are each described by progressive means wherein identical or similar parts between the embodiments may refer to each other, and each embodiment emphasizes on the difference from other embodiments. In particular, since the system embodiments are basically similar to the method embodiments, description thereof is made rather simply while leaving its associated parts to be referred to the corresponding descriptions of the method embodiments.

Some embodiments applicable in the environment or arrangement of multiple of general or dedicated computing systems, such as personal computer, server computer, handheld device or portable device, flat device, multi-processor system, microprocessor based system, set-top box, programmable consumption electronic equipment, network PC, small computer, large computer, and distributed computing environment including any of the above system or device, etc.

Some embodiments may be described in general context of the computer executable instructions executed by the computer, such as program module. In general, program module includes routine, procedure, object, component, data structure etc. executing specific tasks or implementing specific abstract data types. The present invention may also be practiced in distributed computing environment in which tasks are executed by remote processing device connected via communications network. In the distributed computing environment, program module may be located in the storage media of local and remote computers including storage devices.

Those skilled in the art should understand that the present invention, although described by the embodiments, has many variations and changes which, however, do not depart from the spirit of the present invention, and that appended claims should includes these variations and changes without departing from the spirit of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for picture search, comprising:
one or more processors configured to:
receive a picture search request from a user, wherein the picture search request includes a keyword;
identify a first set of found pictures in a picture database, the first set of found pictures corresponding to the keyword in the picture search request;
present a first plurality of sample pictures that corresponds to a plurality of picture shape types to the user, the first plurality of sample pictures being selected from the first set of found pictures, wherein the first plurality of sample pictures is included in a second plurality of sample pictures predetermined based at least in part on:
classifying a plurality of pictures in the picture database according to a plurality of keywords associated with the respective ones of the plurality of pictures and according to the plurality of picture shape types, wherein classifying the plurality of pictures includes, for a first keyword of the plurality of keywords, extracting a set of pictures associated with the first keyword and identifying at least some of the plurality of picture shapes within the extracted set of pictures;
determining the second plurality of sample pictures among the classified plurality of pictures that corresponds to respective ones of the plurality of picture shape types;
receive a determined sample picture that corresponds to a user selection of one of the first plurality of sample pictures; and
identify a second set of found pictures, the second set of found pictures being selected from the first set of found pictures and having a set of corresponding characteristic values that satisfy a predetermined criterion based at least in part on the determined sample picture; and
one or more memories coupled to the one or more processors and configured to provide the one or more processors with instructions.

2. The system of claim 1, wherein the first plurality of sample pictures is presented to the user in a sorted order.

3. The system of claim 1, wherein classifying the plurality of pictures according to the plurality of picture shape types includes comparing a plurality of characteristic values of the plurality of pictures.

4. The system of claim 3, wherein comparing the plurality of characteristic values of the plurality of pictures includes grouping pictures whose differences of characteristic values are within a predetermined distance as pictures of an identical or similar shape types.

5. The system of claim 1, wherein identifying the second set of found pictures includes identifying, among the first set of found pictures, pictures whose distances from a characteristic value vector of the determined sample picture is below a predetermined threshold.

6. The system of claim 1, wherein the second set of found pictures has an identical or a similar shape type to the determined sample picture.

7. The system of claim 1, wherein at least one of the second plurality of sample pictures is marked with an indicator associated with a sample picture.

8. A method for picture search, comprising:
receiving a picture search request from a user, wherein the picture search request includes a keyword;
identifying, using one or more processors, a first set of found pictures in a picture database, the first set of found pictures corresponding to the keyword in the picture search request;
presenting a first plurality of sample pictures that corresponds to a plurality of picture shape types to the user, the first plurality of sample pictures being selected from the first set of found pictures, wherein the first plurality of sample pictures is included in a second plurality of sample pictures predetermined based at least in part on:
classifying a plurality of pictures in the picture database according to a plurality of keywords associated with the respective ones of the plurality of pictures and according to the plurality of picture shape types, wherein classifying the plurality of pictures includes, for a first keyword of the plurality of keywords, extracting a set of pictures associated with the first keyword and identifying at least some of the plurality of picture shapes within the extracted set of pictures;
determining the second plurality of sample pictures among the classified plurality of pictures that corresponds to respective ones of the plurality of picture shape types;
receiving a determined sample picture that corresponds to a user selection of one of the first plurality of sample pictures; and
identifying a second set of found pictures, the second set of found pictures being selected from the first set of found pictures and having a set of corresponding characteristic values that satisfy a predetermined criterion based at least in part on the determined sample picture.

9. The method of claim 8, wherein the first plurality of sample pictures is presented to the user in a sorted order.

10. The method of claim 8, wherein classifying the plurality of pictures according to the plurality of picture shape types includes comparing a plurality of characteristic values of the plurality of pictures.

11. The method of claim 10, wherein comparing the plurality of characteristic values of the plurality of pictures includes grouping pictures whose differences of characteristic values are within a predetermined distance as pictures of an identical or similar shape types.

12. The method of claim 8, wherein identifying the second set of found pictures includes identifying, among the first set of found pictures, pictures whose distances from a characteristic value vector of the determined sample picture are below a predetermined threshold.

13. The method of claim 8, wherein the second set of found pictures has an identical or a similar shape type to the determined sample picture.

14. The method of claim 8, wherein at least one of the second plurality of sample pictures is marked with an indicator associated with a sample picture.

15. A computer program product for picture search, the computer program product being embodied in a non-transitory computer storage medium and comprising computer instructions for:
 receiving a picture search request from a user, wherein the picture search request includes a keyword;
 identifying a first set of found pictures in a picture database, the first set of found pictures corresponding to the keyword in the picture search request;
 presenting a first plurality of sample pictures that corresponds to a plurality of picture shape types to the user, the first plurality of sample pictures being selected from the first set of found pictures, wherein the first plurality of sample pictures is included in a second plurality of sample pictures predetermined based at least in part on:
  classifying a plurality of pictures in the picture database according to a plurality of keywords associated with the respective ones of the plurality of pictures and according to the plurality of picture shape types, wherein classifying the plurality of pictures includes, for a first keyword of the plurality of keywords, extracting a set of pictures associated with the first keyword and identifying at least some of the plurality of picture shapes within the extracted set of pictures;
  determining the second plurality of sample pictures among the classified plurality of pictures that corresponds to respective ones of the plurality of picture shape types;
 receiving a determined sample picture that corresponds to a user selection of one of the first plurality of sample pictures; and
 identifying a second set of found pictures, the second set of found pictures being selected from the first set of found pictures and having a set of corresponding characteristic values that satisfy a predetermined criterion based at least in part on the determined sample picture.

16. The computer program product of claim 15, wherein the first plurality of sample pictures is presented to the user in a sorted order.

17. The computer program product of claim 15, wherein classifying the plurality of pictures according to the plurality of picture shape types includes comparing a plurality of characteristic values of the plurality of pictures.

18. The computer program product of claim 17, wherein comparing the plurality of characteristic values of the plurality of pictures includes grouping pictures whose differences of characteristic values are within a predetermined distance as pictures of an identical or similar shape types.

19. The computer program product of claim 15, wherein identifying the second set of found pictures includes identifying, among the first set of found pictures, pictures whose distances from a characteristic value vector of the determined sample picture are below a predetermined threshold.

20. The computer program product of claim 15, wherein the second set of found pictures has an identical or a similar shape type to the determined sample picture.

* * * * *